(12) United States Patent
Perkins

(10) Patent No.: X1319
(45) Date of Patent: Jun. 16, 1810

(54) COUNTERFEIT,MODE OF COPPERPLATE PRNT

(76) Inventor: Jacob Perkins

United States Patent

Patent No.: X1319

Jacob Perkins

June 16. 1810. Mode of Preventing Counterfeiting see London Journal Arts & Sciences Vol. 1 p. 161.

DRAFTSMAN'S DIVISION.
All communications should be addressed to
"The Commissioner of Patents,
Washington, D. C."

2—328 *a.*

*DEPARTMENT OF THE INTERIOR,*

United States Patent Office.

*Washington, D. C.,* ............................................, *189*_

*SIR:*

*The printed* ..........copies.......... *of Patent No.* J Perkins

..........are....... *exhausted.* June 16, 1810

*As soon as reprinted a copy will be mailed you to complete your order.*

*By direction of the Commissioner:*

*Very respectfully,*

*Chief Clerk.*

3143b6-97-5m